US011770505B1

(12) United States Patent
Nguyen

(10) Patent No.: US 11,770,505 B1
(45) Date of Patent: Sep. 26, 2023

(54) ADAPTIVE STORAGE REDUCTION OF IMAGE AND SENSOR DATA AND INTELLIGENT VIDEO STREAM RESTORATION

(71) Applicant: Lytx, Inc., San Diego, CA (US)

(72) Inventor: Vincent Nguyen, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 28 days.

(21) Appl. No.: 17/665,287

(22) Filed: Feb. 4, 2022

(51) Int. Cl.
*H04N 7/18* (2006.01)
*G11B 20/00* (2006.01)
*H04N 5/77* (2006.01)

(52) U.S. Cl.
CPC ....... *H04N 7/183* (2013.01); *G11B 20/00007* (2013.01); *H04N 5/77* (2013.01); *G11B 2020/00072* (2013.01)

(58) Field of Classification Search
CPC .... H04N 7/183; H04N 5/77; G11B 20/00007; G11B 2020/00072
USPC .......................................................... 348/657
See application file for complete search history.

(56) References Cited

U.S. PATENT DOCUMENTS

| 6,256,348 | B1* | 7/2001 | Laczko | H04N 19/00 |
| | | | | 348/E5.062 |
| 10,854,023 | B1* | 12/2020 | Trinh | G07C 5/008 |
| 2017/0240125 | A1* | 8/2017 | Weigert | H04L 27/0002 |
| 2022/0222012 | A1* | 7/2022 | Matturi | G06F 3/0679 |

FOREIGN PATENT DOCUMENTS

CN          114007059 A   *  2/2022

* cited by examiner

*Primary Examiner* — Michael E Teitelbaum
*Assistant Examiner* — Omer Khalid
(74) *Attorney, Agent, or Firm* — Van Pelt, Yi & James LLP

(57) ABSTRACT

The system includes a processor and memory. The processor is configured to receive sensor data set and video data set associated with a vehicle; determine, using a reduction model, a compressed video data set based at least in part on the sensor data set and the video data set; and transmit or store the compressed video data set. The memory coupled to the processor and configured to provide the processor with instructions.

18 Claims, 7 Drawing Sheets

ADAPTIVE STORAGE REDUCTION OF IMAGE AND SENSOR DATA AND INTELLIGENT VIDEO STREAM RESTORATION

BACKGROUND OF THE INVENTION

Modern transportation vehicles (e.g., airplanes, boats, trains, cars, trucks, etc.) often include a vehicle event recorder in order to support driver safety, operational safety, and operational productivity. A vehicle event recorder typically includes a set of sensors (e.g., cameras, video recorders, audio recorders, accelerometers, gyroscopes, vehicle state sensors, global positioning system sensors, etc.) that report data that can be analyzed to determine the occurrence of incidents such as high-risk events, process inefficiencies, driver compliance, or anomalous events (e.g., distractions, hard braking, lane charge, pedestrians, rain, accidents, risky maneuvers, unexpected locations, proximity risks, vehicle malfunctions, improper driver behavior, etc.). However, only small epochs of interest from an entire high-bandwidth video stream are typically required for review. This presents a problem for efficient use of transmission and storage resources because of the unnecessary expense associated with transmitting and storing full-length high-bandwidth video data.

BRIEF DESCRIPTION OF THE DRAWINGS

Various embodiments of the invention are disclosed in the following detailed description and the accompanying drawings.

DETAILED DESCRIPTION

Figure 1:
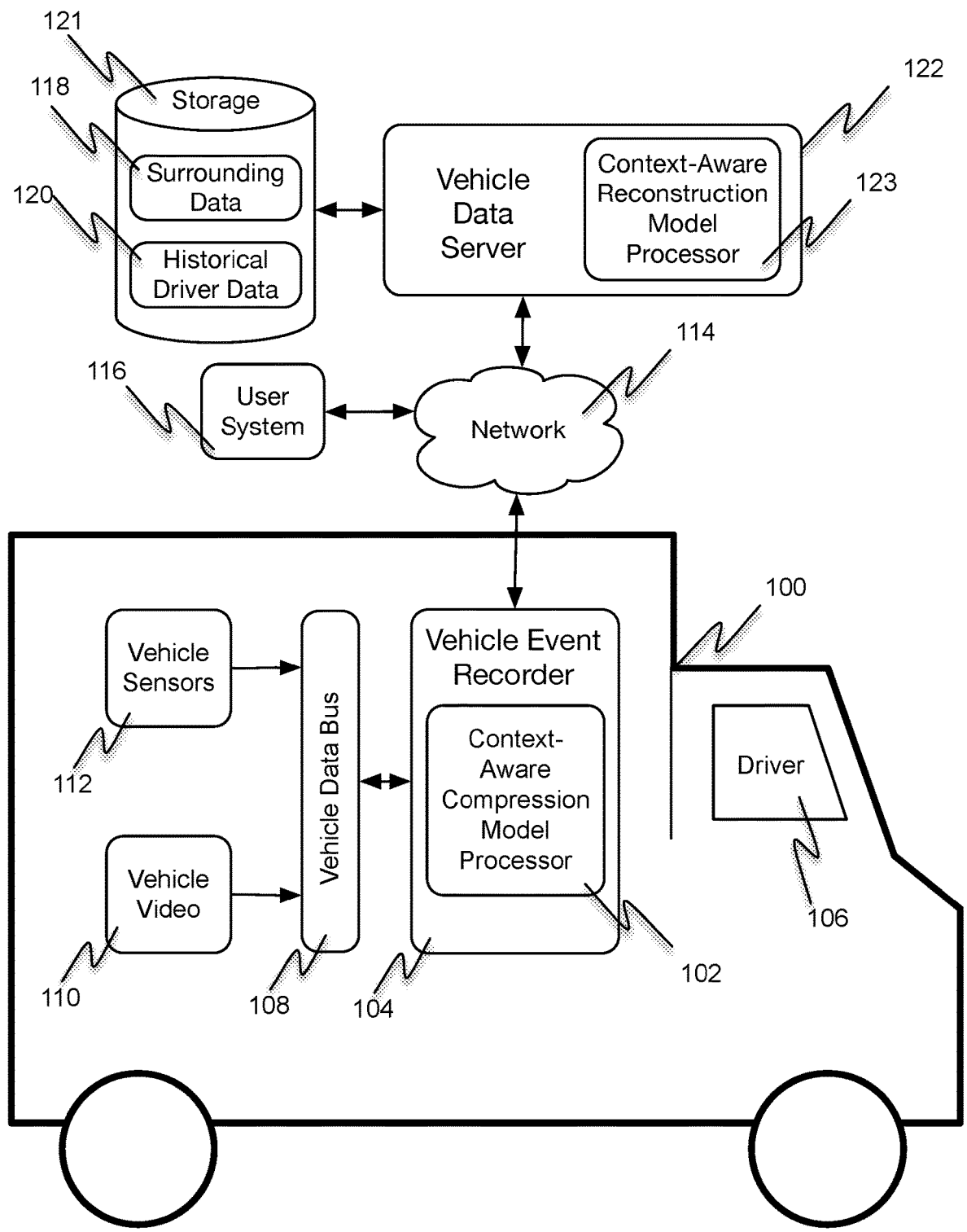
FIG. 1 is a block diagram illustrating an embodiment of a system for adaptive storage reduction of image and sensor data and intelligent video stream restoration. (VER).

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for adaptive storage reduction of image and sensor data and intelligent video stream restoration comprising a processor and a memory is disclosed. A processor for adaptive storage reduction of image and sensor data is configured to receive a sensor data set and a video data set associated with a vehicle and determine, using a reduction model, a compressed video data set based at least in part on the sensor data set and the video data set and transmit or store the compressed video data set. The memory for adaptive storage reduction of image and sensor data is coupled to the processor and configured to provide the processor with instructions. A processor for intelligent video stream restoration is further configured to receive a compressed video data set and a sensor data set and determine, using a reconstruction model, a reconstructed video data set based at least in part on the compressed video data set and the sensor data set and transmit or store the reconstructed video data set. The memory for intelligent video stream restoration is coupled to the processor and configured to provide the processor with instructions.

A vehicle event recorder (VER) typically includes a set of sensors (e.g., cameras, video recorders, audio recorders, accelerometers, gyroscopes, vehicle state sensors, global positioning system (GPS) sensors, etc.) that report data that can be analyzed to determine the occurrence of incidents such as high-risk events, process inefficiencies, driver compliance, or anomalous events. In particular, video data is essential for identifying and documenting a wide range of distracted driving behaviors both inside and outside a vehicle, including cell phone use, eating or drinking, smoking, inattentive driving, lack of seat belt use, failure to stop at intersections, weaving within or departing from lanes, or following another vehicle too closely. The ability to efficiently and accurately capture video of high-risk events allows the VER system to support fleet managers in driver safety training, driver training progress, driver accountability, and driver interventions. However, typically only small epochs of interest from an entire high-bandwidth video stream are required for review. This presents a problem for efficient use of transmission and storage resources because of the unnecessary expense associated with transmitting and storing full-length high-bandwidth video data.

In some embodiments, the system for adaptive storage reduction of image and sensor data uses VER image and sensor data to determine driver and vehicle context and dynamically adapt the degree of video data reduction either through increasing the compression model processor's compression ratio or reducing the number of video frames that the compression model processor transmits. For example, some driver and vehicle contexts have relatively low information content such as driving on a freeway at night where it is known from the GPS data stream that the vehicle is on a straight road and the vehicle perception sensors indicate that there are no cars on the road. If the difference between successive video frames is low and the vehicle sensors are unchanging, the adaptive storage reduction system could either increase the video compression ratio or simply lower the frame rate of the transmitted video stream. In contrast, if the context is a vehicle driving in a city with a rich visual scene and the vehicle sensors indicate many braking or cornering events, the adaptive storage reduction system could lower the video compression ratio or simply increase the frame rate to transmit video data to the vehicle data server at a higher rate.

In some embodiments, the system for intelligent video stream restoration uses vehicle context, vehicle sensor data, surrounding data, and historical driver data to restore a full frame rate video from a compressed video stream with higher visual quality than would have been possible from the compressed or low frame rate video data stream alone. The ability of a reconstruction model processor to restore a compressed video stream to near original quality provides the efficiency and cost reduction of transmitting and storing less video data while preserving the end users visual experience. For example, a fleet driver safety training manager reviewing a compressed video stream transmitted at 1 frame a second results in a fatiguing and choppy visual experience for the manager. Because the compressed video rendering is a poor representation of actual events, it may also be difficult for the reviewer to determine the duration of the particular driver behavior or determine more subtle behaviors such as how well the driver is engaged with driving, where the driver was looking, if their eyes were closed, or other behaviors occurring over a longer timescale for which the reviewer needs to collect evidence.

In some embodiments, the system compresses video during times when it is determined that less relevant information is present. The compression strategy includes removing or reducing video content. The reconstruction of the video content includes using non-video sensor data to aid in reconstruction of the video stream. In some embodiments, non-video sensor data including location information, accelerometer data, speed data, etc. is used to reconstruct video data. In some embodiments, the video compression is lossy and the reconstruction uses prior information (e.g., video data, prior stream video data, post stream video data, etc.) related to the location data, accelerometer data, and/or speed data to reconstruct video data for a vehicle.

In some embodiments, the system improves a computer by increasing efficiency of data storage or data transmission by compressing video data. In some embodiments, the system improves a computer by improving a user interface and viewing experience by reconstructing a video stream prior to a user viewing the data.

FIG. 1 is a block diagram illustrating an embodiment of a system for adaptive storage reduction of image and sensor data and intelligent video stream restoration. In the example shown, vehicle 100 comprises vehicle event recorder 104, context-aware compression model processor 102, vehicle data bus 108, vehicle video 110, vehicle sensors 112, and driver 106. Vehicle event recorder 104 communicates to user system 116 and vehicle data server 122 via network 114. Vehicle data server 122 comprises context-aware reconstruction model processor 123 and is able to access (e.g., sends and receives) surrounding data 118, historical driver data 120, and data stored in storage 121.

Vehicle event recorder 104 receives real-time data from sensors on vehicle event recorder 104 and from vehicle video 110 and vehicle sensors 112 via vehicle data bus 108 as well as real-time surrounding driver data 118 via network 114. In some embodiments, the sensor data set comprises one or more of: an accelerometer data, a gyroscope data, a speed sensor data, a GPS data, a lidar data, an interior camera video data, and/or an exterior camera video data. In some embodiments, the sensor data set includes location information. In some embodiments, the location information enables use of map information for compression. Vehicle event recorder 104 processes the real-time data and historical driver data 120 with context-aware compression model processor 102 to generate a context-aware compressed video stream that is transmitted via network 114 to vehicle data server 122 and context-aware reconstruction model processor 123. In some embodiments, the video data set and/or the sensor data set originates from a vehicle event recorder in the vehicle. In some embodiments, the video data set and/or the sensor data set originates from the vehicle. For example, real-time driver context and real-time surrounding context data indicates that the driver is currently in a construction zone with pedestrians and high traffic density, and the historical driver context data 120 indicates that in the past, such a context has led to near collisions. As a result, context-aware compression model processor 102 adapts its data reduction algorithm to lower its compression ratio and increase its frame rate in order to better capture potential high-risk events with high video and image quality.

In some embodiments, the compressed video data set requires less storage than the video data set. In various embodiments, the compressed video data set has one of the following storage requirements: one half of the storage requirement of the video data set, one third of the storage requirement of the video data set, one fourth of the storage requirement of the video data set, one fifth of the storage requirement of the video data set, one sixth of the storage requirement, one seventh of the storage requirement, one eighth of the storage requirement, one tenth of the storage requirement, one twentieth the storage requirement, or any other appropriate storage requirement.

Context-aware reconstruction model processor 123 generates a high-quality full frame rate reconstructed video for use by user system 116 by processing the compressed video stream data, non-video vehicle sensor data, and vehicle context data from vehicle event recorder 104 and ancillary data including surrounding data 118, historical driver data 120, and other data stored in storage 121. In some embodiments, the compressed video data set and/or the sensor data set originates from a vehicle event recorder in the vehicle. In some embodiments, the compressed video data set and/or the sensor data set originates from the vehicle. For example, context-aware reconstruction model processor 123 receives a highly compressed video with a low frame rate from context-aware compression model processor 102. For example, the video stream was highly compressed with a low frame rate because the context model at the time the data was captured indicated the vehicle was traveling on a freeway at night where it was known from the GPS data stream that the vehicle was on a straight road and the vehicle perception sensors indicated that there were no cars on the road.

In addition to the compressed video stream, context-aware reconstruction model processor 123 receives additional ancillary data that are associated with the received video frames. The ancillary data are used to improve the reconstruction quality of the compressed video especially in cases where video frames are not available. The ancillary data may comprise vehicle sensor data or information from intelligent image processing models that have recognized pedestrians, cyclists, objects, signs, or lanes etc., and their locations at time points where there were no video frames available. In some embodiments, the sensor data set comprises one or more of: an accelerometer data, a gyroscope data, a speed sensor data, a GPS data, a lidar data, an interior camera video data, and/or an exterior camera video data. In some embodiments, the sensor data set includes location information. In some embodiments, the location information enables use of map information for compression. In some embodiments, the map information includes other sensor data associated with the map information. The machine learning algorithms used by the context-aware reconstruction model processor process this ancillary information to interpolate between the missing data to recreate a high-quality visual viewing experience for the end user. In some embodiments, the reconstructed video data set has a higher visual quality than the compressed video data set.

Figure 2:
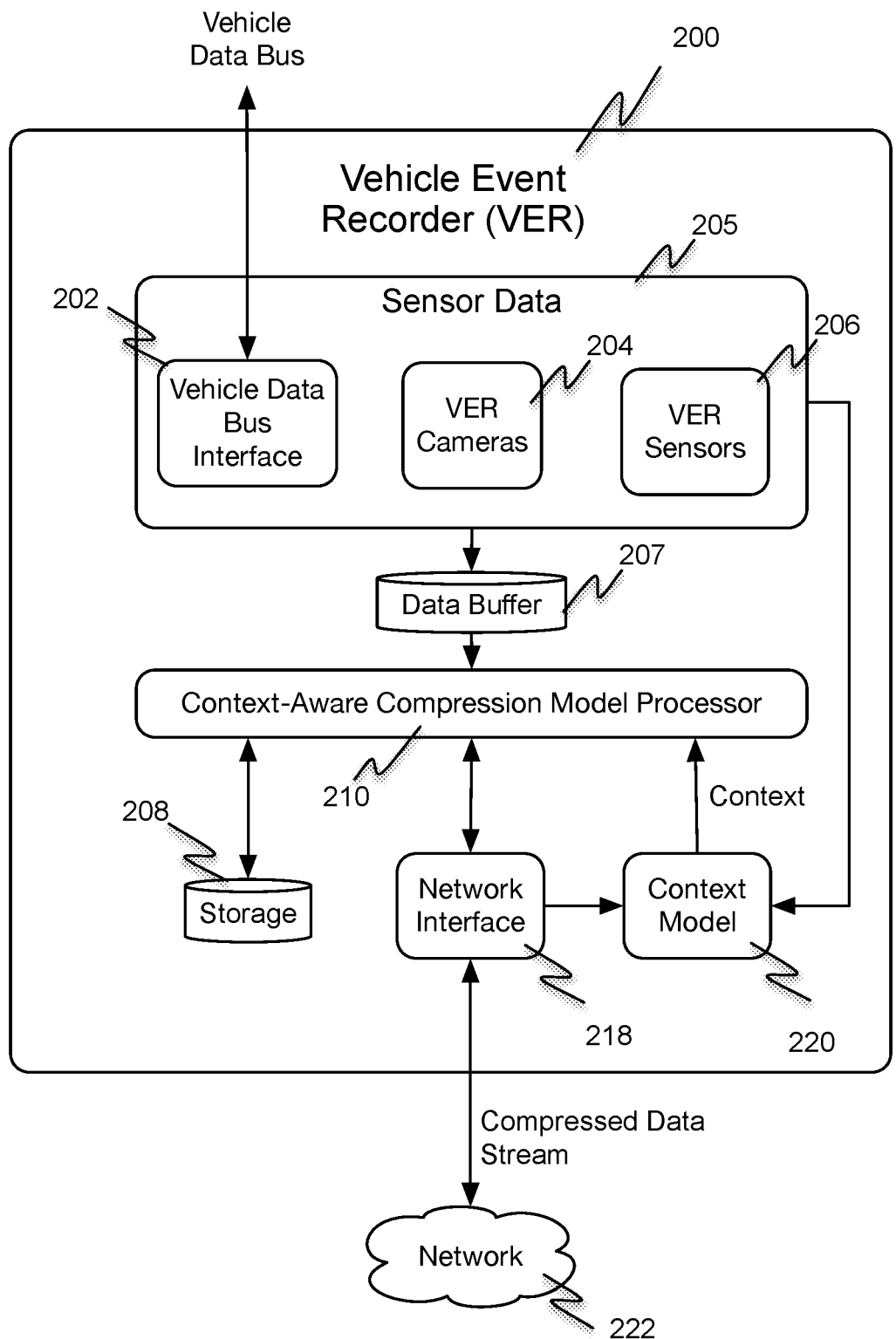
FIG. 2 is a block diagram illustrating an embodiment of a vehicle event recorder

FIG. 2 is a block diagram illustrating an embodiment of a vehicle event recorder (VER). In some embodiments, vehicle event recorder 200 of FIG. 2 is used to implement vehicle event recorder 104 of FIG. 1. In the example shown, vehicle event recorder 200 monitors events as measured by cameras and sensors associated with a vehicle. Vehicle event recorder 200 stores or transmits the event data for later review or use for coaching, training, and/or liability determination. To save on transmission and/or storage, vehicle event recorder 200 compresses video data. Vehicle event recorder 200 uses context-aware compression model processor 210 and context model 220 to achieve this compression. Vehicle event recorder 200 further comprises data buffer 207, storage 208, network interface 218, and sensor data 205. Sensor data 205 aggregates data collected by vehicle and VER cameras and other VER sensors. Sensor data 205 comprises vehicle data bus interface 202 for gathering vehicle video and sensor data, VER cameras 204 for gathering VER video data, and VER sensors 206 for gathering other VER sensor data including location data, accelerometer data, audio data, etc.

Data buffer 207 stores data aggregated by sensor data 205 in a circular buffer. This allows context-aware compression model processor 210 to adapt its degree of data compression of video data stored in data buffer 207 prior to a change in vehicle or driver context. For example, context model 220 determines the vehicle is in a high-risk epoch due to a hard braking event and signals context-aware compression model processor 210 to adapt its compression ratio down and/or increase the video frame rate for data prior to the hard braking event so that the highest quality video leading up to the hard braking event can be stored and/or transmitted via network 222. As another example, context model 220 determines the vehicle is in a low-risk epoch due no peaking in accelerometer data and location information indicating an uneventful road region, and signals context-aware compression model processor 210 to adapt its compression ratio up and/or decrease the video frame rate for data during this road region so that the lowest quality video can be stored and/or transmitted via network 222.

Context-aware compression model processor 210 determines the optimal compression ratio and video frame rate using vehicle and driver context received from context model 220. Real-time driver context and real-time surrounding context data is determined using sensor and video data from sensor data 205. Context model 220 can indicate that the vehicle is in a low, medium, or high or 1 through 10 level compression location or period. As examples, context model 220 can determine that the vehicle is currently in an area of high traffic density, the vehicle sensor data indicates a hard braking event, or the driver is using a cell phone, which all indicate that the context of the vehicle requires low compression of video data. As a result, context-aware compression model processor 102 adapts its data reduction algorithm to lower its compression ratio and increase its frame rate in order to better capture the potential high-risk event with high video and image quality. As other examples, context model 220 can determine that the vehicle is currently in an area of low traffic density, the vehicle sensor data indicates constant speed driving without lane changes, or that the driver is alert and driving attentively, which all indicate that the context of the vehicle point to high compression of video data. As a result, context-aware compression model processor 102 adapts its data reduction algorithm to raise its compression ratio and decrease its frame rate in order to store or transmit data more efficiently. Context-aware compression model processor 210 receives video and sensor data from data buffer 207 and outputs a high or low compression video stream to network 222 via network interface 218. In some embodiments, network interface 218 is used for communication between VER 200 and a vehicle data server and/or user system(s) via network 222. In some embodiments, network 222 of FIG. 2 is used to implement network 114 of FIG. 1.

Network interface 218 receives information about real-time surrounding data, historical driver data, compression model updates, and context model updates via network 222. For example, a fleet manager adds weather conditions to the real-time surrounding data stream and requests when weather conditions are poor for driving, video recordings should be transmitted with low compression. As a result, updates are sent via network interface 218 to context-aware compression model processor 210 and context model 220 to recognize poor weather conditions which subsequently updates the compression ratio for the context of driving in poor weather.

Figure 3:
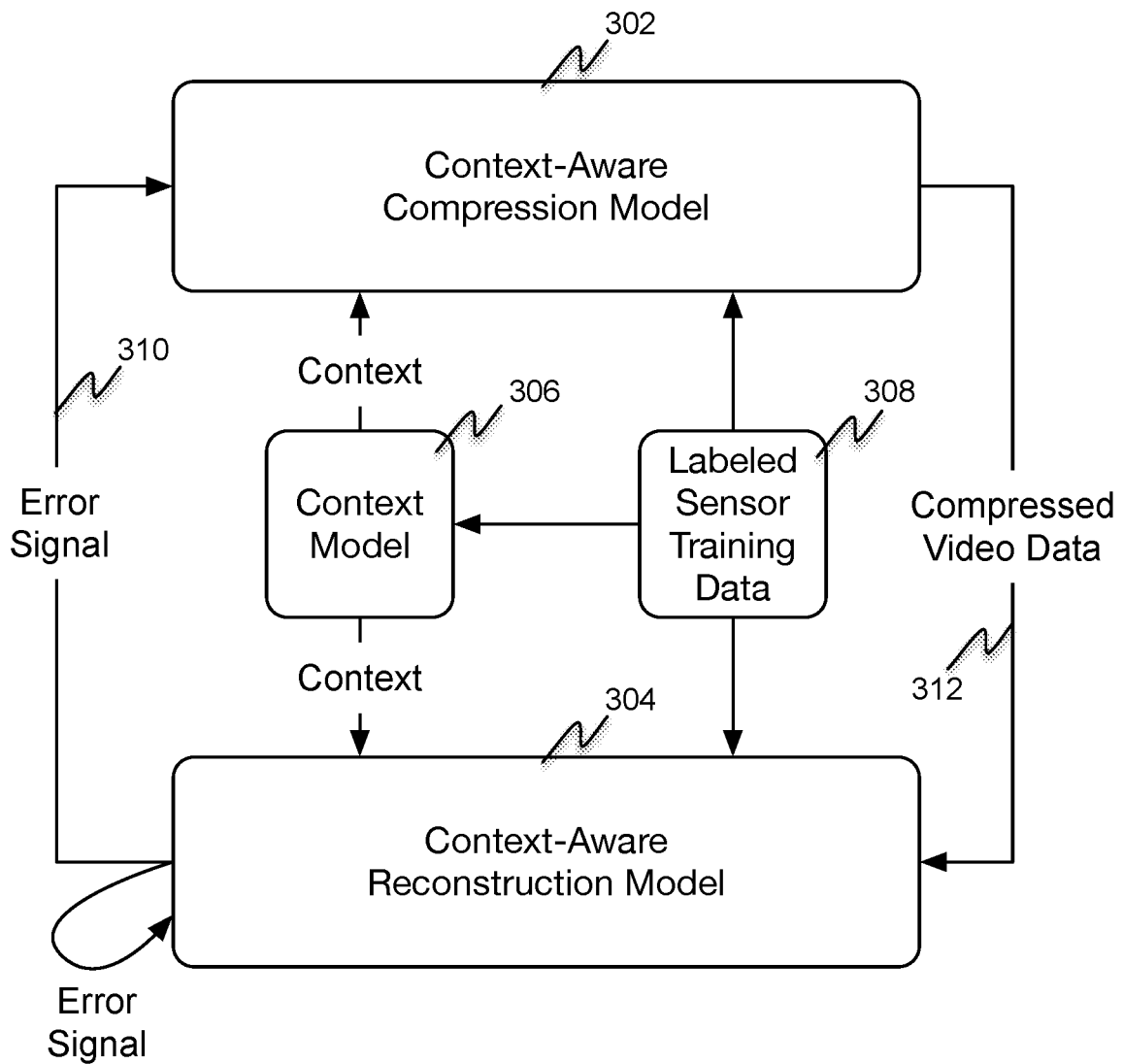
FIG. 3 is a block diagram illustrating an embodiment of a system for training a context-aware compression model, a context-aware reconstruction model, and a context model.

FIG. 3 is a block diagram illustrating an embodiment of a system for training a context-aware compression model, a context-aware reconstruction model, and a context model. In various embodiments, context-aware compression model 302 is used to implement context-aware compression model processor 210 of FIG. 2, context-aware reconstruction model 304 is used to implement context-aware reconstruction model processor 123 of FIG. 1, and context model 306 is used to implement context model 220 of FIG. 2.

In the example shown, labeled sensor training data 308 is received by context-aware compression model 302, context-aware reconstruction model 304, and context model 306. In context-aware compression model 302, video data from labeled sensor training data 308 is compressed with a degree of compression determined by the output of context model 306. The resulting compressed video data stream 312 is output to context-aware reconstruction model 304. In order to train context-aware reconstruction model 304, context model 306 can indicate to compress video data at different compression levels—for example, compressed at low levels, at medium levels, and/or at high levels. The compressed video data stream 312 that is produced at the different levels is then fed into context-aware reconstruction model 304 to reconstruct the video stream. This reconstructed video stream (at different compression levels) is compared to the labeled sensor training data (including full, uncompressed video) 308 and error signal is generated to improve context-aware reconstruction model 304 and context-aware compression model 302. For example, context-aware compression model 302 is improved by changing the number of frames to drop, which frames to drop, etc. based on the context determined compression level—for example, if the error signal is too large, then the number of frames dropped in compression is reduced or if there is more activity in frames those frames are not selected to be dropped, etc. Or, as another example, context-aware reconstruction model 304 is modified to reconstruct a video stream by using more surrounding frames to synthesize video frames or by using more historical data or more data from geographically similar locations. In some embodiments, reconstruction model 304 and compression model 302 are multi-layer neural networks. In some embodiments, context-aware compression model 302 and context-aware reconstruction model 304 are jointly learned to reduce the error. For example, in contexts that have predictable scene statistics (even if the image is changing from frame to frame) such as long stretches of open highway, in vehicle views of the cabin, or roads for which scenes have been previously been recorded, reconstruction model 304 may need only sparse key frames from compression model 302 to reconstruct the full frame rate video at high quality using prior data and statistics.

Training for context model 306 is achieved by providing context model 306 labeled sensor training data 308 and comparing the output of context model 306 with the labels of labeled sensor training data 308. For example, labeled sensor training data 308 includes video and sensor data for situations that have low, medium, and high levels of compression desired associated with the data or for situations that have 1 through 10 levels of compression desired associated with the data or any other appropriate context related compression data. This video and sensor data is fed into context model 306 to generate the low, medium, and high levels of compression labels that are output and compared to the assigned labels. Context model 306 is adjusted to generate labels matching labels of label sensor training data 308. The output of context model 306 is used to set a compression level for context-aware compression model 302. In some embodiments, context model 302 is multi-layer neural network.

Figure 4:
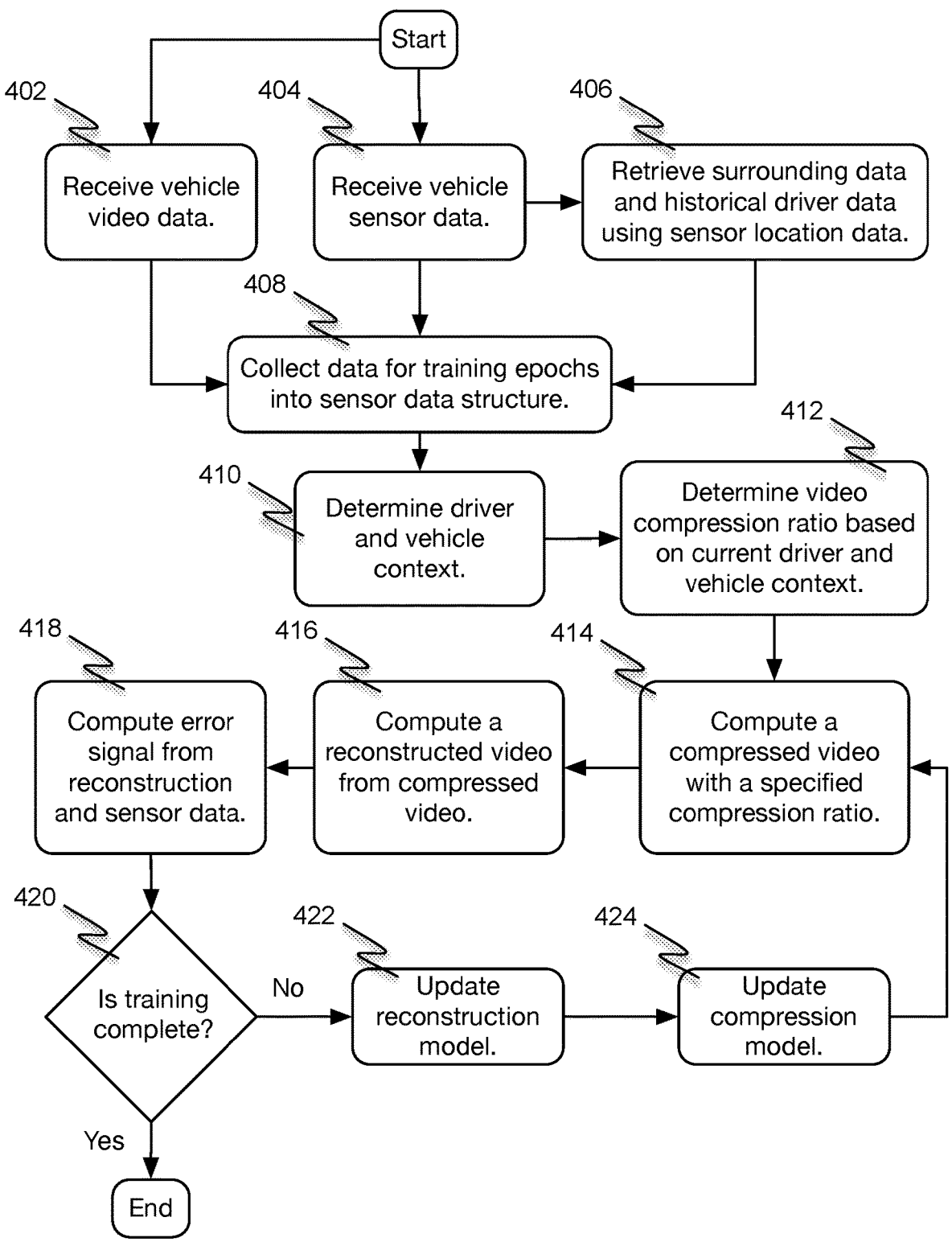
FIG. 4 is a flow diagram illustrating an embodiment of a context-aware model training system.

FIG. 4 is a flow diagram illustrating an embodiment of a context-aware model training system. In some embodiments, the process of FIG. 4 is executed by context-aware model training system of FIG. 3. In the example shown, in 402, vehicle video data are received and control is passed to 408. In 404, vehicle sensor data are received and control is passed to 408. In 406, surrounding data and historical driver data using sensor location data are received and control is passed to 408. In 408, data from 402, 404, and 406 are labeled and collected into a sensor data structure for training epochs and control is passed to 410. For example, labeled sensor training data 408 includes video and sensor data for situations that have low, medium, and high levels of compression desired associated with the data, for situations that have 1 through 10 levels of compression desired associated with the data, or any other appropriate context related compression data. In some embodiments, the reduction model is trained using training sensor data sets, training video data sets, and desired training compressed video data sets. In some embodiments, the reconstruction model is trained using training sensor data sets, training compressed video data sets, and desired training reconstructed video data sets. In 410, driver and vehicle context are determined. For example, for a particular training epoch, sensor and video indicate that the vehicle is in the context of a construction zone and the driver is in the context of talking on a cell phone. In 412, the optimal video compression ratio based on current driver and vehicle context is determined. For example, a driver using a cell phone in a construction zone indicates an epoch of higher risk and as a result, the compression ratio is lowered to capture higher quality video data during the time of higher risk.

In 414, a compressed video with a specified compression ratio is computed. In some embodiments, 414 is implemented by a multi-layer neural network. In some embodiments, the compression ratio is increased during training to determine the highest compression for a given error rate. In 416, a reconstructed video from compressed video is computed. In some embodiments, 416 is implemented by a multi-layer neural network. In 418, an error signal from reconstruction and sensor data is computed and control is passed to 420. For example, for each video frame of the reconstruction and corresponding frame of the original video, the mean-squared error of the differences between frames is computed. In 420, it is determined whether training is complete. For example, it is determined whether the error signal is less than threshold, whether the error signal is not decreasing a threshold amount from a previous training cycle, whether a number of threshold training cycles have been completed, etc. In response to determining that training is complete, the process ends. In response to determining that training is not complete, control passes to 422. In 422, the context-aware reconstruction model is updated and control is passed to 424. For example, in the disclosed system, models are updated according to how well they perform on the task—in this case a larger reconstruction loss (mean squared error in this example) would yield a larger update to the model). As an example, if the reconstruction model is a multi-layer neural network, the network weights are updated using the error signal to generate a video from the compressed video that is more similar to the original video. In 424, the context-aware compression model is updated and control is passed to 414. For example, if the compression model is a multi-layer neural network, the network weights are updated using the error signal to generate a compressed video that is more similar to the original video. In some embodiments, the error signal is used to adjust the compression ratio to achieve the best reconstruction for the highest degree of compression.

In some embodiments, to train a compression model, the reconstruction model and the target frame rate are fixed to be static. Then, the process is executed up to 414 of FIG. 4. Now, the compression model can be optimized to achieve the lowest reconstruction loss calculated in step 418. In some embodiments, for a set of training videos, the training task is split between compression and reconstruction. For example, both models are trained in tandem on the partitioned dataset (train reconstruction for one epoch, then train compression for one epoch and repeat until convergence).

In some embodiments, the training signal for the compression model comes from human feedback. For example, consider the set of reconstructed videos displayed to clients: some of these will be unsatisfactory by client standards. Further, a subset of the unsatisfactory videos will have a low reconstruction error. These unsatisfactory and low reconstruction error videos indicate that the issue was not with the quality of the interpolated frames. However, for these cases, the full video can be retrieved and less compression can be used (e.g., dropping less frames) in order to achieve appropriate compression model and context aware reconstruction model.

Figure 5:
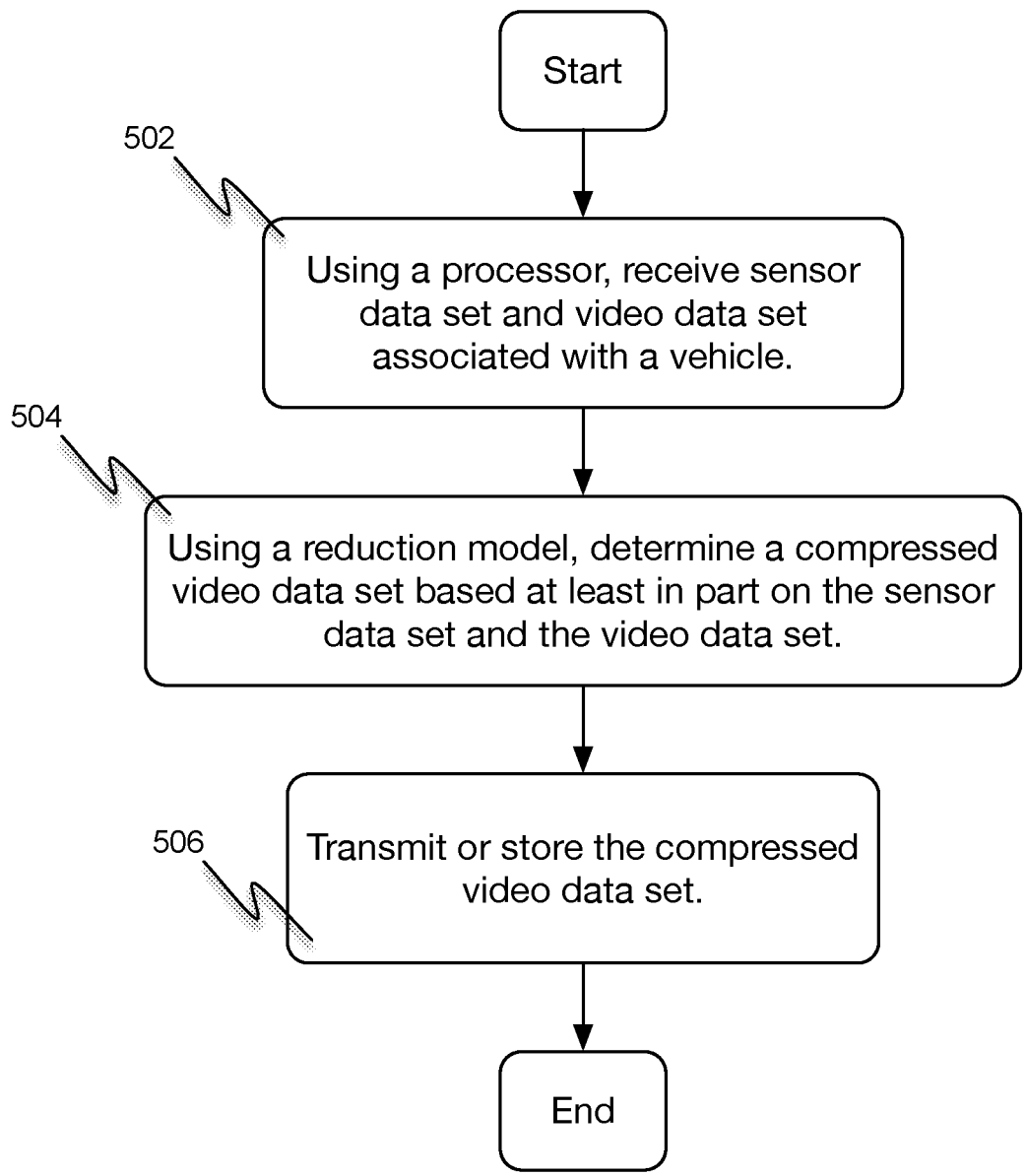
FIG. 5 is a flow diagram illustrating an embodiment of a system for adaptive storage reduction of image and sensor data.

FIG. 5 is a flow diagram illustrating an embodiment of a system for adaptive storage reduction of image and sensor data. In some embodiments, the process of FIG. 5 is executed by the system for adaptive storage reduction of image and sensor data and intelligent video stream restoration of FIG. 1. In the example shown in 502, a sensor data set and a video data set associated with a vehicle are received using a processor. In various embodiments, the sensor data set comprises one or more of: an accelerometer data, a gyroscope data, a speed sensor data, a GPS data, a lidar data, an interior camera video data, an exterior camera video data, and/or any other appropriate sensor data. In some embodiments, the sensor data set includes location information. In various embodiments, the sensor data and/or video data is used to derive other data including speed data, traffic data, weather data, or any other appropriate derived data, and this derived data is used for deriving context for the compression process. In some embodiments, the location information enables use of map information for compression.

In 504, a compressed video data set based at least in part on the sensor data set and the video data set is determined using a reduction model. In some embodiments, reduction model is implemented by context-aware compression model processor 210 of FIG. 2. For example, context-aware compression model processor receives video and sensor data and outputs a high or low compression video stream. In some embodiments, the compressed video data set is based at least in part on the derived data from the sensor data and/or the video data.

In 506, the compressed video data set is transmitted or stored. In some embodiments, compressed video data set is transmitted via a network to a vehicle data server. In some embodiments, a vehicle data server is implemented by vehicle data server 122 of FIG. 1.

Figure 6:
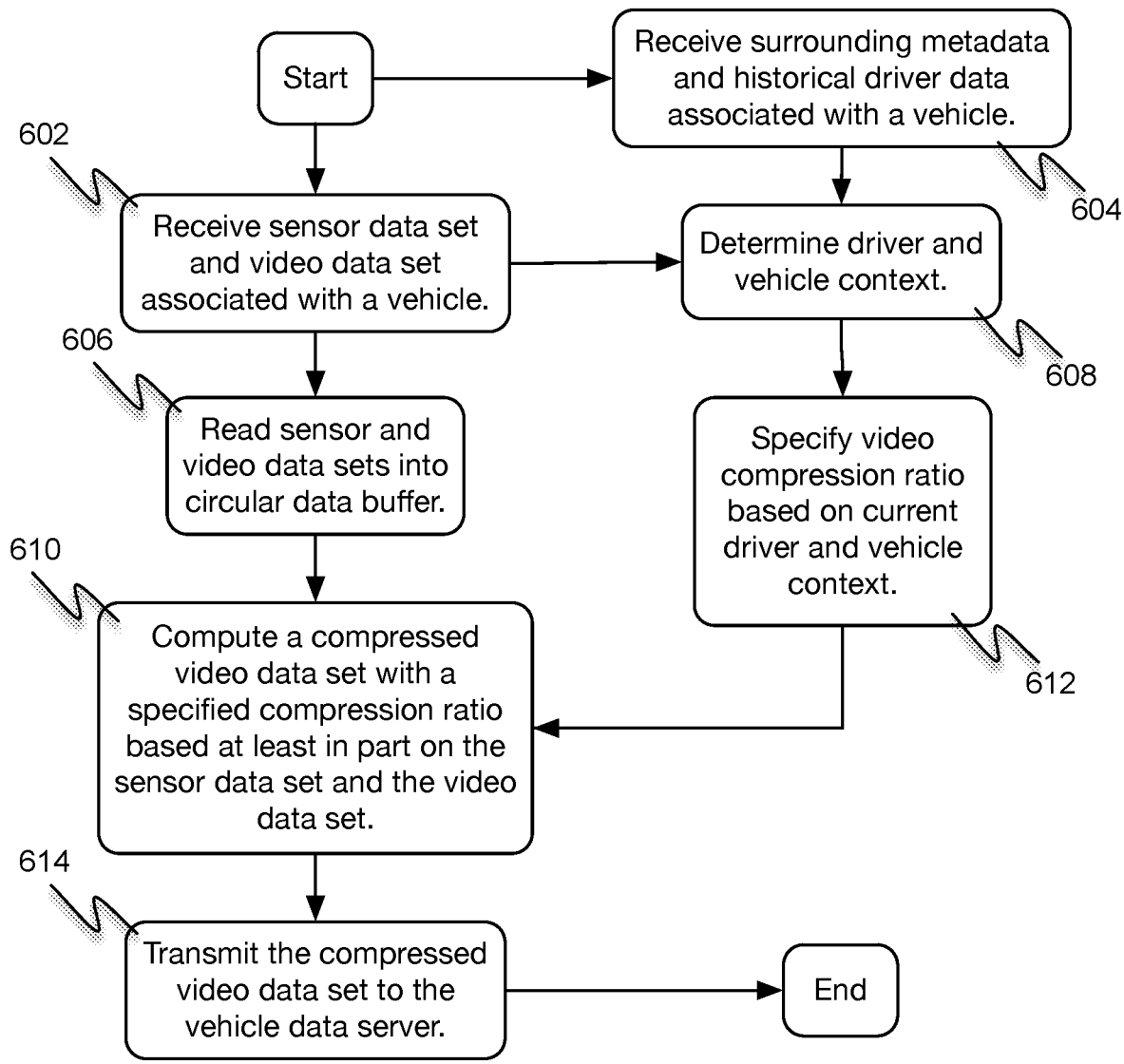
FIG. 6 is a flow diagram illustrating an embodiment of a system for adaptive storage reduction of image and sensor data.

FIG. 6 is a flow diagram illustrating an embodiment of a system for adaptive storage reduction of image and sensor data. In some embodiments, the process of FIG. 6 is executed by the system for adaptive storage reduction of image and sensor data and intelligent video stream restoration of FIG. 1. In the example shown in 602, the sensor data set and the video data set associated with a vehicle is received and control is passed to 606 and 608. In some embodiments, the sensor data set comprises one or more of: an accelerometer data, a gyroscope data, a speed sensor data, a GPS data, a lidar data, an interior camera video data, and/or an exterior camera video data. In some embodiments, derived data from the sensor data set and the video data set is also received. In various embodiments, derived data includes velocity data derived from GPS data analysis, traffic data derived from video data analysis, weather data derived from temperature and video data analysis, or any other appropriate derived data.

In 604, surrounding metadata and historical driver data associated with a vehicle is received and control is passed to 608. For example, weather data about current road conditions and areas of higher risk for traffic accidents are received. In 608, driver and vehicle context are determined and control is passed to 612. For example, it is determined that the driver and vehicle are in a higher risk context because driver is talking on a cell phone while driving in a construction zone. In some embodiments, the driver and vehicle context are determined using a model trained to recognize known factors that can determine context that would influence a compression level. In 612, video compression ratio based on current driver and vehicle context is specified. For example, a high ratio of compression is specified for the context of a vehicle on a long stretch of open highway and no other vehicles nearby. In some embodiments, the degree of compression is specified for situations that have low, medium, and high levels of compression, or for situations that have 1 through 10 levels of compression, or any other appropriate context related compression specification.

In 606, sensor and video data sets are read into a circular data buffer. This allows context-aware compression model processor to adapt its degree of data compression of video data stored in the data buffer prior to a change in vehicle or driver context. For example, the context determined in 608 is a vehicle in a high-risk epoch due to a hard braking event. Because it is desired to record high-quality full frame rate video prior to the hard braking event, video data prior to the braking event can be processed from the data still retained in the buffer.

In 610, a compressed video data set with a specified compression ratio based at least in part on the sensor data set and the video data set is computed and control is passed to 614. For example, context-aware compression model processor receives video and sensor data and outputs a high or low compression video stream. In 614, the compressed video data set to the vehicle data server is transmitted. In some embodiments, compressed video data set is transmitted via a network to a vehicle data server. In some embodiments, vehicle data server is implemented by vehicle data server 122 of FIG. 1.

Figure 7:
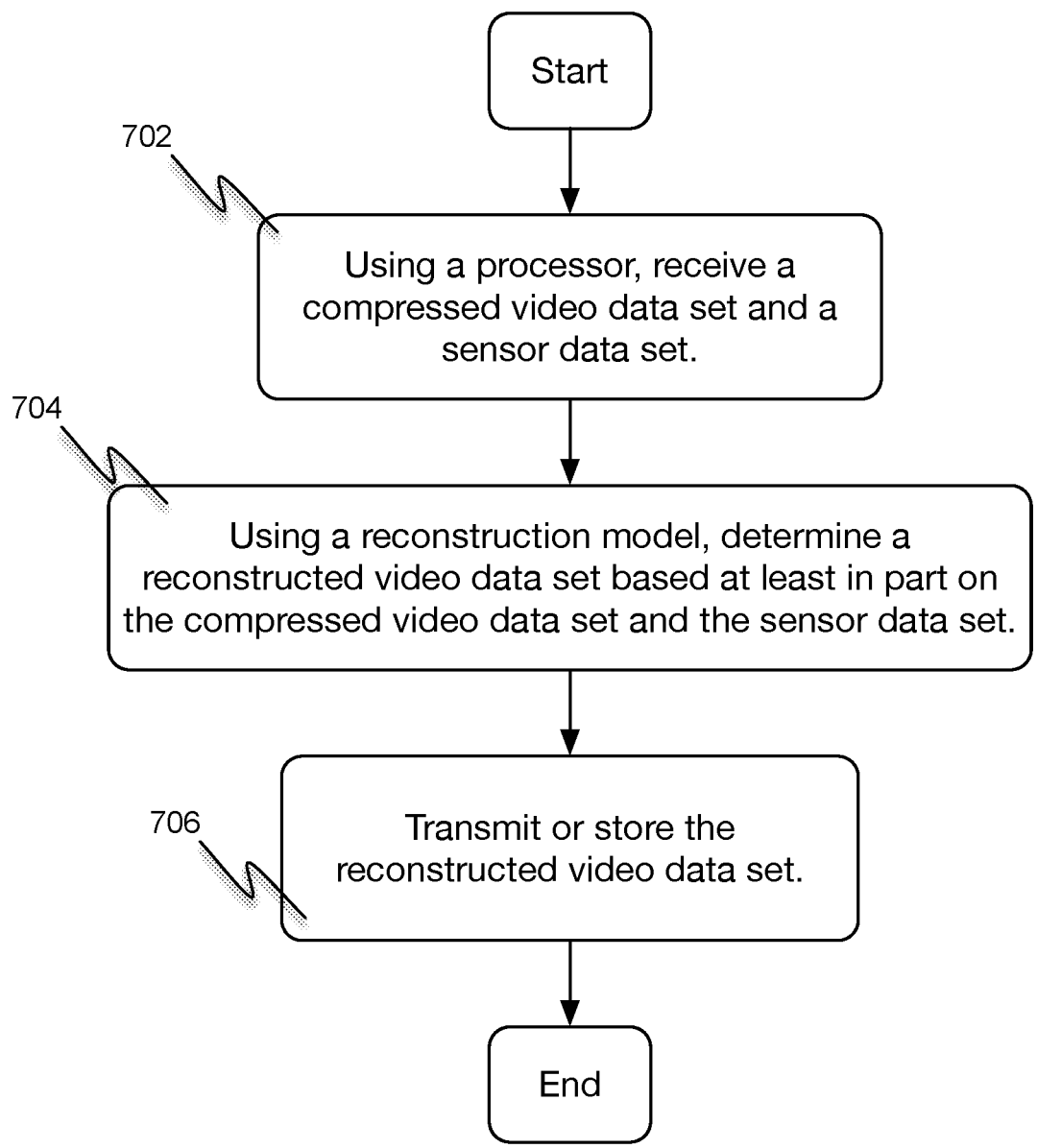
FIG. 7 is a flow diagram illustrating an embodiment of a system for intelligent video stream restoration.

FIG. 7 is a flow diagram illustrating an embodiment of a system for intelligent video stream restoration. In some embodiments, the process of FIG. 7 is executed by the system for adaptive storage reduction of image and sensor data and intelligent video stream restoration of FIG. 1. In the example shown in 702, a compressed video data set and a sensor data set is received using a processor. For example, a context-aware reconstruction model processor receives a highly compressed video with a low frame rate from context-aware compression model processor. In some embodiments, derived data is also received based on the sensor data.

In 704, a reconstructed video data set based at least in part on the compressed video data set and the sensor data set is determined using a reconstruction model and control is passed to 706. For example, a high-quality full frame rate reconstructed video is generated by a multi-layer neural network processing the compressed video stream data, non-video vehicle sensor data, vehicle context, and ancillary data including surrounding data, historical driver data, and other data stored in storage. In some embodiments, the reconstructed video data set is based at least in part on a compressed video data set, a sensor data set, and/or a derived data set. In 706, the reconstructed video data set is transmitted or stored. For example, the reconstructed video data is sent to a user system where a fleet manager reviews the video for driver compliance.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
receive sensor data set and video data set associated with a vehicle;
determine, using a reduction model, a compressed video data set based at least in part on the sensor data set and the video data set, wherein the reduction model is trained using training sensor data sets, training video data sets, and desired training compressed video data sets; and transmit or store the compressed video data set; and a memory coupled to the processor and configured to provide the processor with instructions.

2. The system as in claim 1, wherein the video data set and/or the sensor data set originates from a vehicle event recorder in the vehicle.

3. The system as in claim 1, the video data set and/or the sensor data set originates from the vehicle.

4. The system as in claim 1, wherein the sensor data set comprises one or more of: an accelerometer data, a gyroscope data, a speed sensor data, a GPS data, a lidar data, an interior camera video data, and/or an exterior camera video data.

5. The system as in claim 1, wherein the compressed video data set requires less storage than the video data set.

6. The system as in claim 5, wherein the compressed video data set has one of the following storage requirements: one half of the storage requirement of the video data set, one third of the storage requirement of the video data set, one fourth of the storage requirement of the video data set, one fifth of the storage requirement of the video data set, one sixth of the storage requirement, one seventh of the storage requirement, one eighth of the storage requirement, one tenth of the storage requirement, or one twentieth the storage requirement.

7. The system as in claim 1, wherein the sensor data set includes location information.

8. The system as in claim 7, wherein the location information enables use of map information for compression.

9. A method, comprising:

receiving, using a processor, sensor data set and video data set associated with a vehicle;

determining, using a reduction model, a compressed video data set based at least in part on the sensor data set and the video data set, wherein the reconstruction model is trained using training sensor data sets, training compressed video data sets, and desired training reconstructed video data sets; and transmitting or storing the compressed video data set.

10. A system, comprising:

a processor configured to:

receive a compressed video data set and a sensor data set;

determine, using a reconstruction model, a reconstructed video data set based at least in part on the compressed video data set and the sensor data set, wherein the reconstruction model is trained using training sensor data sets, training compressed video data sets, and desired training reconstructed video data sets; and transmit or store the reconstructed video data set; and a memory coupled to the processor and configured to provide the processor with instructions.

11. The system as in claim 10, wherein the compressed video data set and/or the sensor data set originates from a vehicle event recorder in the vehicle.

12. The system as in claim 10, the compressed video data set and/or the sensor data set originates from the vehicle.

13. The system as in claim 10, wherein the sensor data set comprises one or more of: an accelerometer data, a gyroscope data, a speed sensor data, a GPS data, a lidar data, an interior camera video data, and/or an exterior camera video data.

14. The system as in claim 10, wherein the reconstructed video data set has a higher visual quality than the compressed video data set.

15. The system as in claim 10, wherein the sensor data includes location information.

16. The system as in claim 15, wherein the location information enables using map information for reconstruction.

17. The system as in claim 15, wherein the map information includes other sensor data associated with the map information.

18. A method, comprising:

receiving, using a processor, a compressed video data set and a sensor data set;

determining, using a reconstruction model, a reconstructed video data set based at least in part on the compressed video data set and the sensor data set, wherein the reconstruction model is trained using training sensor data sets, training compressed video data sets, and desired training reconstructed video data sets; and transmitting or storing the reconstructed video data set.

* * * * *